United States Patent Office 3,380,896
Patented Apr. 30, 1968

3,380,896
HIGH PURIFICATION OF PHTHALIC ANHY-
DRIDE BY MULTI-STAGE REDUCED PRES-
SURE DISTILLATION
Werner Scheiber and Otto L. Garkisch, Frankfurt am
Main, Germany, assignors to Metallgesellschaft Aktien-
gesellschaft, Frankfurt am Main, Germany
Filed May 2, 1966, Ser. No. 546.807
Claims priority, application Germany, May 4, 1965,
M 65,101
8 Claims. (Cl. 203—77)

ABSTRACT OF THE DISCLOSURE

A process which can be run continuously for the recovery of highly purified phthalic anhydride from an aged oxidation product of naphthalene or o-xylene in which the resulting crude phthalic anhydride is first heated under pressure to avoid evaporation of any of the phthalic anhydride, then subjected to an equilibrium evaporation distillation by a relief of pressure under super atmospheric pressure during which crude phthalic anhydride is distilled off and high boiling non-volatile impurities are continuously removed as a sump product, and then the distilled phthalic anhydride is treated in a multistage rectifier to remove volatile impurities and the phthalic anhydride is finally distilled under vacuum to remove high boilers formed in the rectifier.

---

Figure 1:
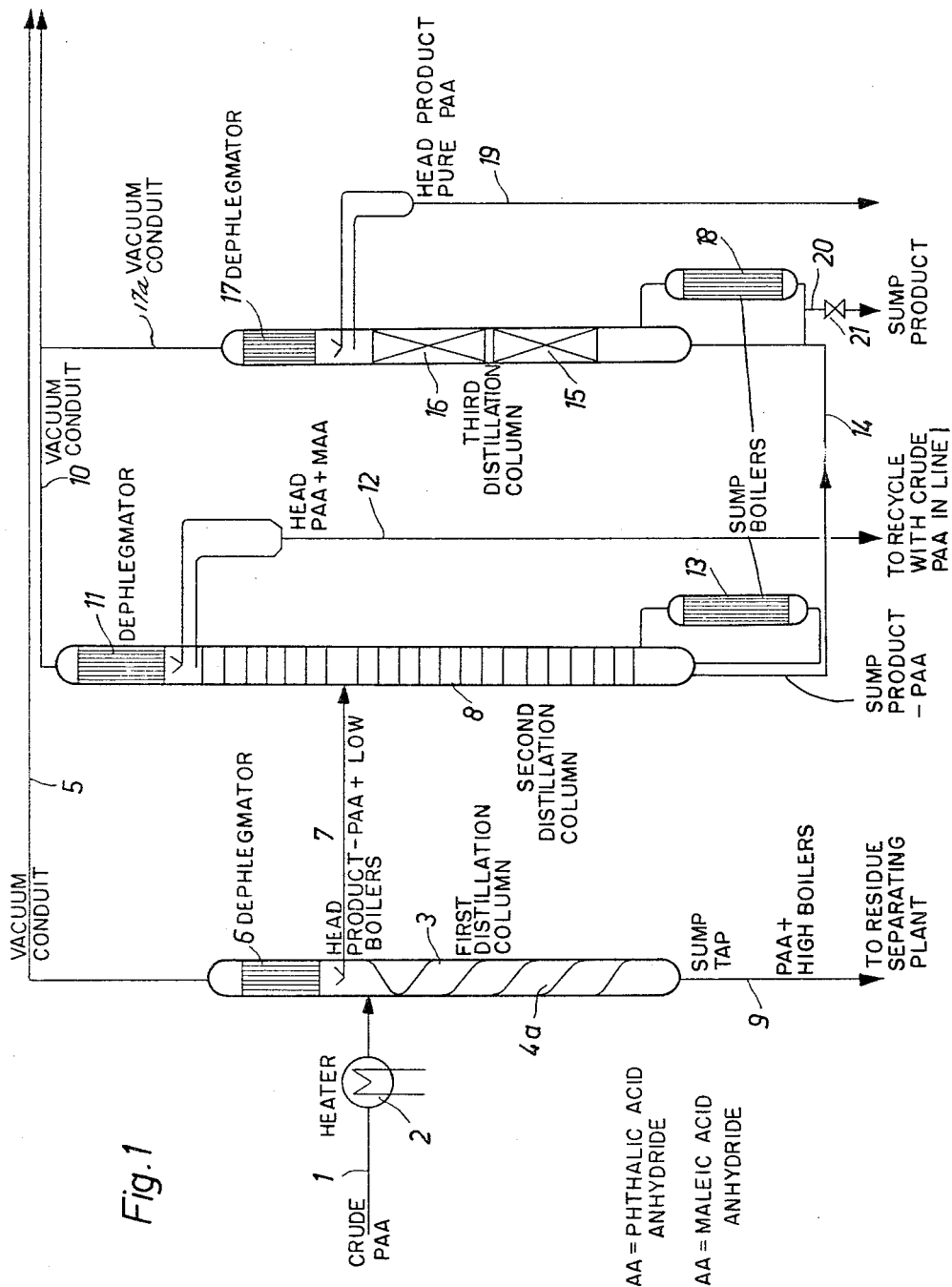

This invention relates to recovering purified phthalic anhydride from the oxidation product of either naphthalene or o-xylene employing selective distillation steps under reduced pressure particularly adapted to a continuous process.

Phthalic anhydride is presently recovered from the oxidation product of naphthalene or o-xylene by batch distillation in a purity of 99.8%, which is required for further processing. The distillation is usually carried out after an aging treatment, which is effected by a prolonged heating at 250–280° C. under atmospheric pressure and, if desired, in the presence of sulfuric acid or other admixtures.

This aging serves to destroy impurities, such as monocarboxylic acids, aldehydes and quinones, or to transform them into nonvolatile components. The easily volatile impurities, mainly maleic anhydride, are initially distilled off in a distillation which succeeds the aging treatment and is carried out with the aid of a still. Then the main portion of the oxidation product is stripped off as purified phthalic anhydride and the condensation polymers formed during the preceding aging are removed from the still as a residue. For production on a relatively small scale, the batch operation is still quite economical. Like any other batch process, however, the batch distillation of the crude phthalic anhydride requires more labor than would be required in continuous processes, which could be carried out more or less automatically with the aid of measuring and control equipment. Besides, a batch operation does not result in a product of uniform quality throughout the distillation of the charge because the first and last portions are of lower purity.

The consumption of phthalic anhydride has increased in recent years and so has the capacity of the plants for producing it. Plants having an output of 2000–3000 tons per month are in operation or under construction.

The equipment for batch distillation using a still, which is the only process that is practical so far, cannot be designed as a unit for a capacity above a limit of approximately 800 tons per month. With previously known processes, higher outputs can only be achieved by an addition of a plurality of smaller distillation units.

One of the reasons for this limitation is the fact that the ratio of still area to still volume increases with the size of the unit so that the heat transfer in large units is adversely affected. Another reason is the fact that horizontal stills cannot be used for a distillation of crude phthalic anhydride because stirrers which are indispensable for the distillation of phthalic anhydride in horizontal stills can be installed only with great difficulty. Continuously operating plants for distilling phthalic anhydride and ensuring a recovery of high purity phthalic anhydride which is required for the production of plastic materials have not been known heretofore.

The present invention relates to a process which enables recovery of phthalic anhydride of very high purity in a continuous distillation process. This high purity meets all previous requirements as well as the increased requirements to be expected in the future for phthalic anhydride. In this process, the oxidation product of o-xylene or the oxidation product of naphthalene may be used as a starting material. In both cases, the aging pretreatment which is known per se may be employed according to the starting material treated.

An essential feature of the invention is that at least a considerable part of the heat which is required for evaporating the crude phthalic anhydride is supplied to the latter as tangible heat before the crude phthalic anhydride is introduced into the distillation equipment and while said crude phthalic anhydride is maintained under a pressure which prevents virtually any evaporation of the crude phthalic anhydride during this preheating step. Then the crude phthalic anhydride is subjected to an equilibrium evaporation by a relief of pressure. This equilibrium evaporation is carried out under a superatmospheric pressure, suitably about 100–150 millimeters mercury absolute pressure.

During this equilibrium distillation according to the known processes of still-distillation, a major portion of the crude phthalic anhydride, preferably about 97% thereof, is distilled off and the high-boiling and nonvolatile impurities are continuously removed as a sump product. For this purpose, the crude phthalic anhydride which has been recovered from naphthalene is heated to about 450° C. before it is introduced into the distillation equipment.

In a preferred embodiment of the invention, where the oxidation product of o-xylene is treated before the equilibrium evaporation, this starting material is preheated only to about 280° C. so that only about 40% thereof is evaporated by flashing whereas the additional amount of heat required for evaporating a total of about 97% of the feed is supplied by a sump boiler.

The prepurified phthalic anhydride which has been distilled off in the flashing unit is then supplied to a multistage rectifying column, which is also operated under a vacuum and in which the readily volatile impurities, such as maleic anhydride, are distilled off. The sump product, from which the readily volatile impurities have been removed, is then subjected to simple equilibrium evaporation in a third column, which is also operated under vacuum, and is withdrawn as a head product. This final distillation is only required to ensure that the very small traces of higher-boiling substances which have formed during the multistage rectification in the second column are removed from the end product so that it is normally not required to withdraw the sump product from this final distillation column. If higher-boiling impurities have increased in the sump of this final column after a long period of continuous operation, part of the sump product may be withdrawn from this column.

Figure 2:
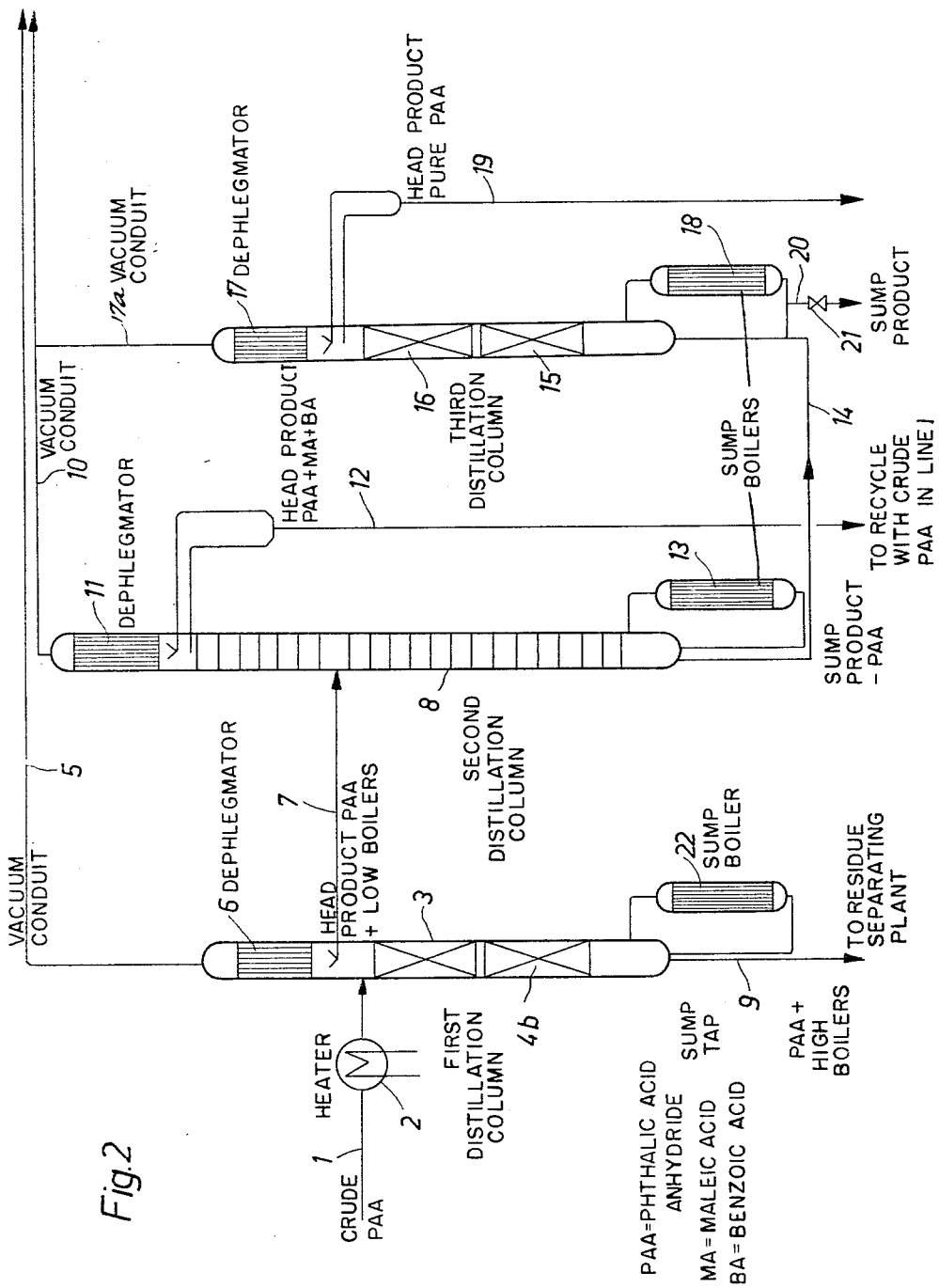

The process of the invention is illustrated in the accompanying drawings wherein FIGURE 1 is a schematic diagram of a continuous process according to the invention in which very pure phthalic anhydride is recovered from an oxidation product of naphthalene and FIGURE 2 is a schematic diagram of a continuous process according to the invention in which very pure phthalic anhydride is recovered from an oxidation product of o-xylene.

Similar reference numerals in each drawing indicate corresponding parts in the process.

The process of the invention accordingly comprises producing very pure phthalic anhydride, i.e., phthalic anhydride having a purity of higher than 99.7% and preferably higher than 99.9%, continuously by (a) heating a starting material from line 1 comprising either the oxidation product of naphthalene or o-xylene to a temperature between about 220° C. and 450° C. by heating means 2 under pressure which is sufficient to suppress virtually all evaporation of the starting material during heating, i.e., a pressure up to 15 kg./cm.$^2$, then (b) subjecting the heated starting material to a pressure relief in first distillation column 3 operating under reduced pressure, i.e., a suitable pressure of about 100 to 150 mm. of Hg absolute, (c) withdrawing from the first distillation column a head product consisting of more than 90%, e.g., more than 97%, of the starting material, (d) distilling this head product from the first distillation column 3 in a multistage second distillation or rectification column 8 operating at a bottom temperature of about 200 to 230° C. under reduced pressure, i.e., a pressure of about 100 to 160 mm. of Hg absolute to obtain a sump product, (e) distilling this sump product in a final distillation column 15, operating at a top temperature of 187 to 205° C. and a pressure of 60 to 100 mm. Hg absolute to obtain very pure phthalic anhydride.

The invention is further described with reference to the following examples. Example 1 is described with reference to FIGURE 1 and Example 2 is described with reference to FIGURE 2.

Example 1

The material which was available was a pre-aged oxidation product of hot-pressed naphthalene stock. This starting product had a typical analysis as follows:

|   | Wt. percent |
|---|---|
| Phthalic anhydride | 95.5 |
| Maleic anhydride | 0.5 |
| Residue | 4.0 |

This feedstock was charged at 280° C. at a rate of 1000 kg. per hour through conduit 1 and heater 2 into the first column 3. The feedstock was heated to 450° C. in the heater. Except for a helix 4a, the flashing column 3 was empty. By means of the vacuum conduit 5, the column 3 was held at a pressure of 100 mm. mercury. The dephlegmator 6 was operated at a temperature of 203 to 205° C. so that virtually the entire head product was passed through column 7 into the fine fractionating column 8. The amount of product passed through line 7 was about 930 kg. per hour. Thus, there was only a spurious reflux in the space between the inlet of conduit 1 and the dephlegmator 6. The bottom temperature in column 8 was maintained at 215 to 218° C.

120 kg. of a heavy product containing 70% phthalic anhydride were withdrawn from the sump tap 9 and passed to a separate plant, not shown, for separating the residue. By means of a conduit 10, a pressure of 90 mm. mercury (absolute pressure) was maintained in the fine fractionating column 8. Column 8 had 30 plates. In this case, the dephlegmator 11 was operated at a temperature of 150 to 155° C. to maintain a reflux ratio of 50:1, based on the withdrawn head product. The head product was obtained at a rate of 15 kg. per hour and consisted mainly of maleic anhydride and phthalic anhydride. It was withdrawn through conduit 12 and recycled to the crude phthalic anhydride. The sump boiler 13 was operated to maintain a re-evaporation ratio of 1, based on the total feed to the column. The sump product from the fine fractionating column 8, i.e., about 915 kg. per hour, was introduced through conduit 14 into the final column 15, where it was virtually completely removed as head product. The final column 15 was filled with packing elements (Raschig rings) 16. A reflux ratio below 0.5, based on the withdrawn head product, was maintained with the aid of the dephlegmator 17, operated at a temperature of 188 to 190° C. and the sump boiler 18. The top temperature in column 15 was maintained at 188 to 190° C. and the pressure was maintained at 60 to 70 mm. Hg absolute by means of vacuum line 17a. Part of the sump product may be withdrawn after a prolonged period of operation through conduit 20 and valve 21.

The pure phthalic anhydride which was thus recovered at about 915 kg. per hour through line 19 had the following analysis data:

| | |
|---|---|
| Melting point | 130.9° C. |
| Hazen number | Below 10. |
| Heat Hazen number | Below 40. |
| Maleic anhydride content | Below 0.1%. |
| Phthalic anhydride content | 99.85%. |
| Phthalic acid content | Cannot be detected. |
| Naphthoquinone content | Below 0.1 part per million. |

Example 2

The material which was available was an oxidation product of a 95% o-xylene and had a typical analysis as follows:

|   | Wt. percent |
|---|---|
| Phthalic anhydride | 99.4 |
| Maleic anhydride | 0.35 |
| Residue | 0.2 |
| Benzoic acid, toluic acid, phthalide | Traces |

This starting material was charged at a rate of 1000 kg. per hour through a conduit 1 and a heater 2 into the first column 3 at a pressure of 28.446 pounds per square inch gauge pressure and at a temperature of 280° C. This equilibrium evaporation column 3 was packed with Raschig rings 4b. By means of the vacuum conduit 5, a pressure of 150 mm. mercury was maintained in the column 3. The top temperature in column 3 was 218 to 220° C. The dephlegmator 6 was operated at a temperature of 218 to 220° C. so that virtually the entire head product was passed through conduit 7 into the fine fractionating column 8. The amount of product passed through line 7 is about 980 kg. per hour. As the preheating of the starting material to 280° C. did not supply sufficient heat to the starting material for the desired evaporation of 98%, the additional heat which is required is introduced into the system by the sump boiler 22. 20 kg. per hour of a product containing about 90% phthalic anhydride were withdrawn from the sump tap 9 and passed to a separate unit, not shown, for separating the residue. By means of a conduit 10, a pressure of 90 mm. mercury (absolute pressure) was maintained in the fine fractionating column 7. The temperature in column 8 was 200° C. In this case, the dephlegmator 11 was operated at a temperature of 200° C. to maintain a reflux ratio of 50:1, based on the withdrawn head product. The head product was obtained at a rate of 10 kg. per hour and consisted mainly of maleic acid, benzoic acid and phthalic anhydride. It was withdrawn through conduit 12. By means of the sump boiler 13, a re-evaporation ratio of 1, based on the total feed to the column, was maintained. Column 8 had 30 plates. The sump product from the fine fractionating column 8 was fed through conduit 14 to the final column 15, where it was virtually completely removed as a head product. The sump product was passed through line 14 at about 970 kg. per hour. The final column 15 was filled with packing elements 16 (Raschig rings). Column 15 was maintained at a pressure of 60 mm. Hg absolute by means of vacuum line 17a. With the aid of the dephlegmator 17 operated at a temperature of 188° C. and the sump boiler 18, a reflux ratio below 0.5, based on the widthdrawn head product, was maintained. Part of the sump product can be withdrawn through conduit 20 and valve 21 after a prolonged period of operation.

The pure phthalic anhydride which was thus recovered had the following analysis data:

| | |
|---|---|
| Melting point | 131° C. |
| Hazen number | Below 5. |
| Heat Hazen number | Below 30. |
| Maleic anhydride content | Below 0.1%. |
| Phthalic anhydride content | 99.85%. |
| Phthalic acid content | Cannot be detected. |
| Benzoic acid content | Cannot be detected. | through line 19.

The term first distillation column as employed herein is intended to refer to and include both the flashing column 3 employed in preceding Example 1 and the equilibrium evaporation column 3 employed in Example 2.

The preferred conditions maintained in the first, second and final columns according to the invention employing a typical oxidation product of o-xylene or naphthalene are as follows:

With oxidation product of o-xylene

| | 1st column | 2nd column | Final column |
|---|---|---|---|
| Temperature (° C.) | 218–220 | 200–205 | 188 |
| Pressure (mm. Hg absolute) | 150 | 90–100 | 60 |
| Plates | | 30 | |
| Reflux ratio | | 40:1–50:1 | |
| With oxidation product of naphthalene: | | | |
| Temperature (° C.) | 203–205 | 215–218 | 188–190 |
| Pressure (mm. Hg absolute) | 100 | 90–100 | 60–70 |
| Plates | | 30 | |
| Reflux ratio | | 40:1–50:1 | |

We claim:

1. In a process for recovering very pure phthalic anhydride from a starting material selected from the group consisting of the oxidation products of naphthalene and o-xylene, the steps comprising in combination
   heating the starting material to a temperature of about 220 to 450° C. under pressure to suppress virtually all evaporation of the starting material,
   subjecting the heated starting material to a pressure relief in a first distillation column operating under reduced pressure,
   withdrawing from the first distillation column a head product consisting of more than 90% by weight of the starting material,
   distilling the head product from the first distillation column in a second distillation column operating under reduced pressure to obtain a sump product and
   distilling the sump product of the second column in a final distillation column operating under reduced pressure
to obtain, as a head product, very pure phthalic anhydride.

2. A process as in claim 1 wherein said second and final distillation columns are operated at a pressure lower than that in the first column.

3. A process as in claim 1 wherein the starting material is heated to a temperature between about 240 and 280° C. before subjecting it to a pressure relief in the first distillation column; the pressure in the first distillation column is maintained at about 150 mm. Hg absolute pressure; and about 97% by weight of the starting material is withdrawn as head product in the first distillation column.

4. A process as in claim 1 wherein the starting material is heated to about 450° C. before subjecting it to a pressure relief in the first distillation column; the pressure in the first distillation column is maintained at about 100 mg. Hg absolute pressure; and the sole source of heating the first distillation column is the heated starting material.

5. A process as in claim 1 wherein the second distillation column is a reflux column operated with at least about 20 theoretical plates and a reflux ratio of at least about 30:1 based on the head product withdrawn from the second distillation column.

6. A process as in claim 1 wherein at least 40% by weight of the starting material is flashed in said first distillation column.

7. In a process for recovering very pure phthalic anhydride from a starting material consisting of an oxidation product of naphthalene, the steps comprising in combination
   heating the starting material to about 450° C.,
   subjecting the heated starting material to a pressure relief in a first distillation column operating at a pressure of about 100 millimeters of mercury absolute pressure, the heated starting material being the sole source of heating the first distillation column,
   withdrawing from the first distillation column a head product consisting of more than 90% by weight of the starting material,
   distilling the head product from the first distillation column in a second distillation column operating at a reflux ratio of about 50:1, a pressure of about 90 millimeters mercury absolute pressure and a temperature of about 200 to 205° C. to obtain a sump product distilling the sump product from the second distillation column in a final distillation column operating at a pressure of about 60 millimeters mercury absolute pressure and a temperature of about 188° C.
to obtain head product phthalic anhydride which is at least 99.8% by weight pure.

8. In a process for recovering very pure phthalic anhydride from a starting material consisting of an oxidation product of o-xylene, the steps comprising in combination
   heating the starting material to about 280° C. under a pressure of about 28.446 pounds per square inch to suppress virtually all evaporation of the starting material,
   subjecting the heated starting material to a pressure relief in a first distillation column operating at a pressure of about 150 millimeters mercury absolute pressure, the starting material being heated in the first distillation column,
   withdrawing from the first distillation column a head product consisting of more than 90% by weight of the starting material,
   distilling the head product from the first distillation column in a second distillation column operating at a reflux ratio of about 50:1, a pressure of about 90 millimeters mercury absolute pressure and a temperature of about 200° C. to obtain a sump product,
   distilling the sump product from the second distillation column in a final distillation column operating at a pressure of about 60 milimeters mercury absolute pressure and a temperature of about 188° C.
to obtain head product phthalic anhydride which is at least 99.8% by weight pure.

References Cited

UNITED STATES PATENTS

| | | | |
|---|---|---|---|
| 2,670,325 | 2/1954 | West et al. | 260—346.7 |
| 2,786,805 | 3/1957 | Sullivan et al. | 260—346.7 |
| 3,011,955 | 12/1961 | Brown | 260—346.7 |
| 3,135,669 | 6/1964 | Taggart | 203—88 |

WILBUR L. BASCOMB, JR., *Primary Examiner.*